United States Patent [19]

Makhobey

[11] Patent Number: 5,014,999
[45] Date of Patent: May 14, 1991

[54] PRESSURE ENHANCED SELF ALIGNING SEAL

[75] Inventor: Mark Makhobey, Phoenix, Ariz.

[73] Assignee: Car-Graph, Inc., Tempe, Ariz.

[21] Appl. No.: 319,332

[22] Filed: Mar. 6, 1989

[51] Int. Cl.[5] .......................... F16J 15/16; F16J 15/54
[52] U.S. Cl. ................................ 277/3; 277/27; 277/75; 277/142; 277/175; 277/195; 277/198
[58] Field of Search .................. 277/3, 27, 26, 174, 277/175, 176, 173, 35, 47, 59, 63, 136, 137, 97, 98, 99, 142, 143, 100, 88, 195, 198, 75

[56] References Cited

U.S. PATENT DOCUMENTS

| | | | |
|---|---|---|---|
| 2,631,907 | 3/1953 | Johnson, Jr. | 277/143 |
| 2,867,458 | 1/1959 | Kroekel | 277/142 X |
| 2,888,286 | 5/1959 | Scheffler, Jr. et al. | 277/142 X |
| 2,917,329 | 12/1959 | Laser . | |
| 2,937,039 | 5/1960 | Santapa . | |
| 2,971,783 | 2/1961 | Laser | 277/59 X |
| 2,985,473 | 5/1961 | Parker | 277/97 |
| 3,061,318 | 10/1962 | Laser | 277/88 X |
| 3,119,623 | 1/1964 | Shevchenko | 277/3 |
| 3,268,232 | 8/1966 | Richards | 277/175 X |
| 3,333,855 | 8/1967 | Andresen | 277/142 X |
| 3,575,424 | 4/1971 | Taschenberg | 277/27 |
| 4,405,134 | 9/1983 | Sargent et al. . | |
| 4,415,167 | 11/1983 | Gits | 277/88 |
| 4,722,534 | 2/1988 | Wentworth . | |

FOREIGN PATENT DOCUMENTS

| | | | |
|---|---|---|---|
| 1052735 | 12/1966 | United Kingdom | 277/63 |
| 1142326 | 2/1969 | United Kingdom | 277/63 |

Primary Examiner—Allan N. Shoap
Attorney, Agent, or Firm—Gregory J. Nelson

[57] ABSTRACT

A self aligning ring seal for sealing a rotating member such as a shaft of a gas turbine relative to the housing. The ring seal includes a housing retaining a static, resilient seal. A seal plate engages the resilient seal and the seal plate has a curved peripheral edge which permits movement of the seal plate relative to the housing. An annular ring seal assembly extends about the shaft preferably of a carbon or other temperature-resistant material held in compression by an outer compressing ring. The ring seal assembly has a sealing face engaging the seal plate. In the event of shaft misalignment, the sealing faces of the seal plate and ring seal assembly remain in substantially full sealing contact with the misalignment being translated to the static seal.

18 Claims, 4 Drawing Sheets

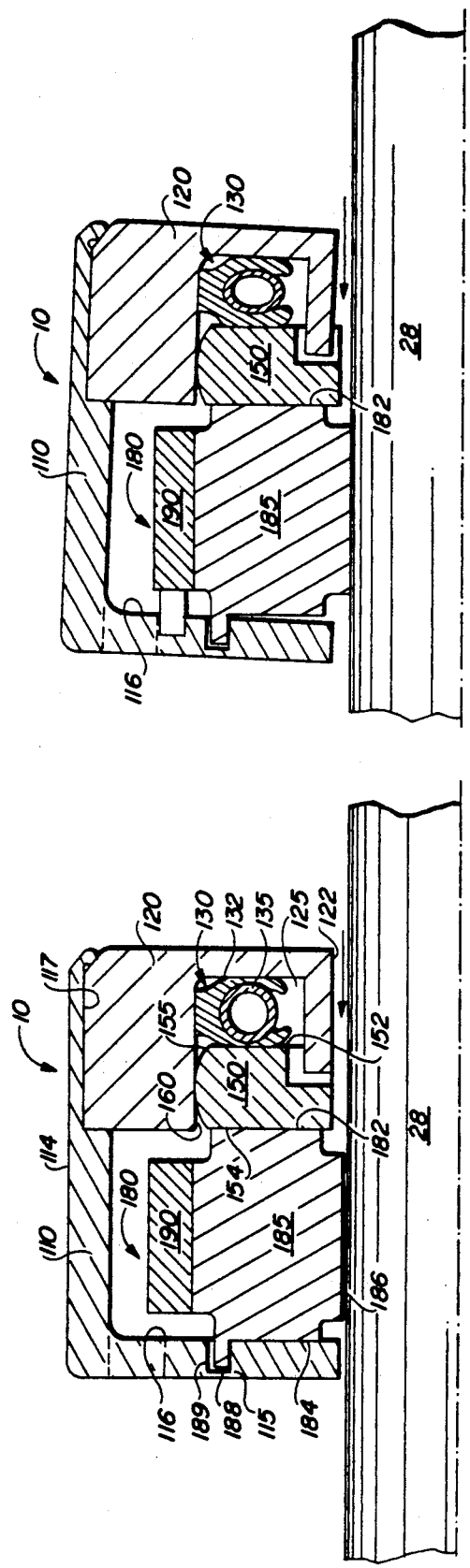
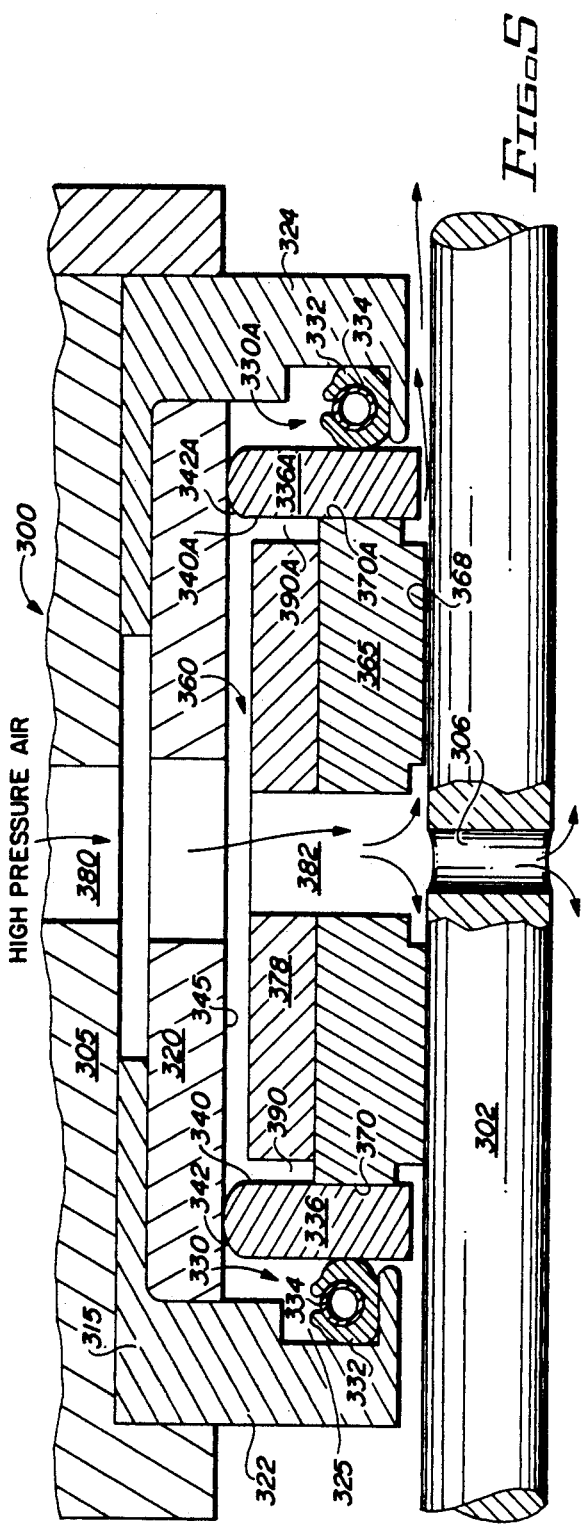

PRESSURE ENHANCED SELF ALIGNING SEAL

The present invention relates to seals and more particularly relates to ring seals of the type used for sealing the static and rotatable components in devices such as gas turbine engines.

The development of the gas turbine engine has placed strong emphasis on the requirement for effective sealing arrangements about rotating shafts. Sealing technology must address problems of high speed, high temperature and high pressure while maintaining low leakage rates. Generally in sealing arrangements for such applications, non-contacting seals are used in which the sealing surface between static and rotatable components operate in close proximity to define a clearance space through which a controlled fluid flow is permitted. A number of non-contacting gas seals for sealing relatively rotating parts having particular application to rotating members in gas turbines can be found in the prior art.

U.S. Pat. No. 2,917,329 discloses a cartridge-type rotary seal for preventing leakage of a high temperature gas along a high speed rotary shaft. This patent suggests the use of carbon or ceramic materials as a rotor material. A retaining ring is placed around the outer surface of the rotor to ensure that the rotor is always in compression. The ring prevents destruction of the rotor by the relatively greater thermal expansion of the rotating shaft. Grooves may be placed in the inner surface of the rotor to reduce contamination and the possibility of binding.

U.S. Pat. No. 2,937,039 also relates to a controlled gap seal. A carbon sealing ring is compressibly held by an outer metallic ring which is shrink-fitted about the carbon ring. A controlled gap seal structure is provided which incorporates a shaft-like sleeve arranged for sealing relation with a composite sealing member. The shaft-like sleeve functions as a substitute shaft with the operational temperatures of the sleeve approximating the operational temperatures of the composite sealing ring providing improved gap control.

U.S. Pat. No. 3,333,855 relates to a circumferential seal which floats in a supporting structure to accommodate eccentricities, runouts and misalignment of the parts to be sealed. Specifically, the patent discloses a circumferential shaft seal having a spring loaded contractable shaft embracing seal ring carried in a self-centering floating support accommodating shaft runouts without damage to the ring seal while at the same time dampening the tendency of the ring seal to open up leakage gaps under eccentric shaft action.

U.S. Pat. No. 4,405,134 discloses a non-contacting gas seal between static and rotatable components of a gas turbine engine. A ring seal is composed of a plurality of overlapping segments which cooperate to define a sealing face. The segments are located in a housing preferably on the static component with the sealing face confronting a sealing face on the rotating component of the arrangement so that in operation the segments lift away from the rotating component to ride on a gas film leaving a very small clearance. A secondary seal is formed between the ring seal and the housing to avoid leakage around the ring seal. At least one of the overlapping surfaces of the segments is contoured to provide a fulcrum to facilitate tilting of the segments.

U.S. Pat. No. 4,722,534 discloses an end face mechanical seal having a pair of seal rings with opposed faces which are urged into sealing relationship to one another to seal a high pressure fluid. The seal faces are yieldably biased into contact with one another to define a dynamic seal therebetween. The seal ring support member is telescopically arranged about the outer cylindrical surface of one of said rings such that the exposed surface area end regions of the cylindrical surface of the support ring are subjected to selectable differential pressures which cause the associated seal ring to distort to cause the seal face of the associated ring to assume a selected angle of convergence relative to the seal face of the other seal ring.

The foregoing are representative of various sealing arrangements which primarily utilize the principle of controlled gap operation. In such applications, as in the case of a jet engine, the rotative speeds involved may range from about 3,000 rpm to about 75,000 rpm. The pressure differential may be typically in the range of 1 psi to 500 psi with operational temperatures encountered up to 1200° F. Prior art ring seal design concepts which serve to maintain a controlled gap clearance are effective in many installations. However, such seal arrangements are inherently limited by the constraint of shaft to housing misalignments. This is particularly true with larger seal configurations used in main propulsion engines.

This constraint is usually overcome by sacrificing seal clearance and attempting to deal with the additional seal leakage through the bore of the seal. In the conventional ring seal, the bore clearance can never be less than the shaft-to-housing misalignment, otherwise the ring seal will lift off the axial sealing face and create excessive leakage.

Briefly, the present invention provides a pressure enhanced self aligning ring seal assembly which operates with a minimum of bore clearance and which is independent of shaft misalignment problems. The seal assembly of the present invention provides minimum leakage at a wide range of operating conditions.

Briefly, in accordance with the present invention, the seal assembly incorporates a static seal which is axially compressed in a retainer or housing to provide static sealing. Under static conditions, a minimum of clearance is maintained between the shaft and the ring seal assembly. The ring seal assembly consists of an outer annular steel ring and an inner carbon ring which are shrink-fitted to form an integral sealing assembly unit. The material of the annular ring seal is matched to the thermal characteristics of the shaft so that physical changes due to temperature will be the same in both parts. High pressure fluid acts only on the bore of the ring seal and not on the outside diameter. A seal plate is interposed between the ring seal assembly and the static seal plate which is self-aligning as it is permitted to pivot radially and axially relative to the bearing housing.

As shaft misalignment occurs, one face of the ring seal assembly is caused to lift off the face of the retainer As the ring seal assembly misaligns to the seal housing, the self-aligning sealing plate remains flat and in full contact against the opposite sealing face of the ring seal assembly maintaining a primary sealing interface. The self-aligning sealing plate translates shaft misalignment to the static seal as this member is flexible and can accommodate misalignment.

Thus, dynamic shaft misalignment is translated to static misalignment and sealed with an appropriate seal. Minimum leakage through the seal assembly is achieved by operating at minimum bore clearances and maintaining a positive seal across the face of the ring seal due to the self-aligning feature. Leakage across the carbon ring seal face and leakage across the carbon bore is minimized.

The above and other objects, features and advantages of the present invention will be more fully understood with reference to the accompanying drawings in which:

FIG. 3 is a partial longitudinal sectional view of an improved seal assembly constructed in accordance with the principles of the present invention;

FIG. 3A is a partial longitudinal sectional view similar to FIG. 3 illustrating the operational independence of the seal assembly of the present invention to shaft shaft misalignment;

FIG. 5 is a partial longitudinal sectional view showing still another embodiment of the seal assembly of the present invention.

Figure 1:
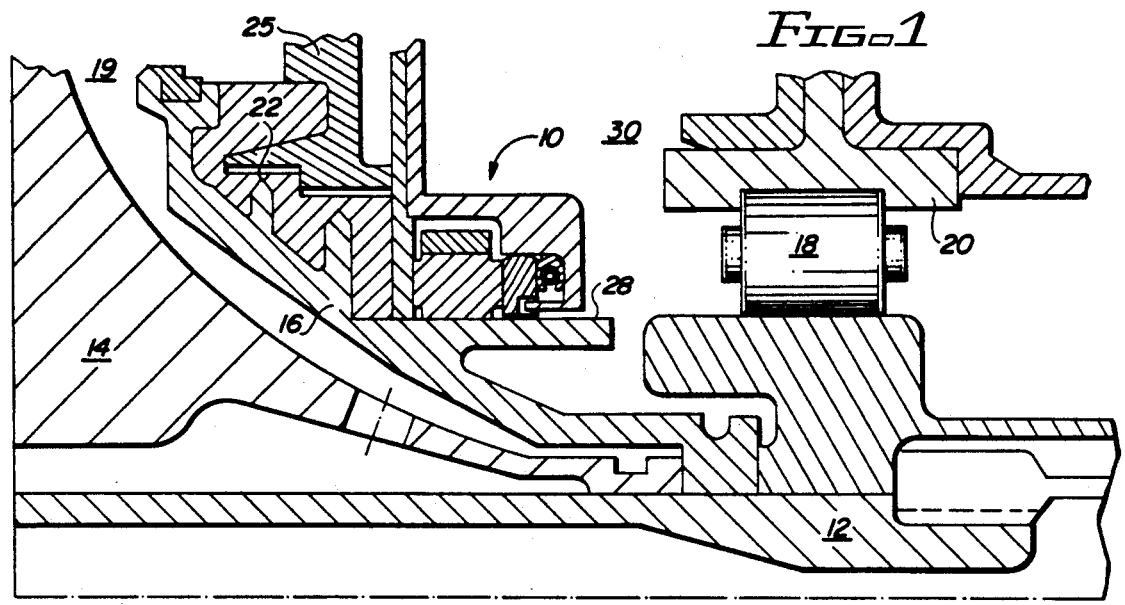
FIG. 1 is a partial sectional elevation of the turbine stage of a gas turbine engine incorporating a ring seal according to the present invention.

Referring now to the drawings, FIG. 1 is representative of a portion of a gas turbine engine in which a ring seal assembly 10 is mounted. The gas turbine engine includes an axially extending shaft 12 which carries a plurality of turbine blades 14. A roller bearing 18 is held in place by a bearing carrier 20 at the low pressure side of the seal assembly 10 and engages a portion of the shaft 12.

Seal runner 16 is rotatable with the shaft and has a plurality of knife edge seals 22 which engage sealing surfaces of the stator member 25. The seal runner 16 defines a generally horizontally extending sealing face 28 which rotates with the shaft. The seal assembly 10 provides sealing along sealing face 28 between the high pressure side 19 and the low pressure area 30. As indicated, seals in this environment must be capable of effectively sealing at high RPM's, pressure differentials and temperatures.

Figure 2:
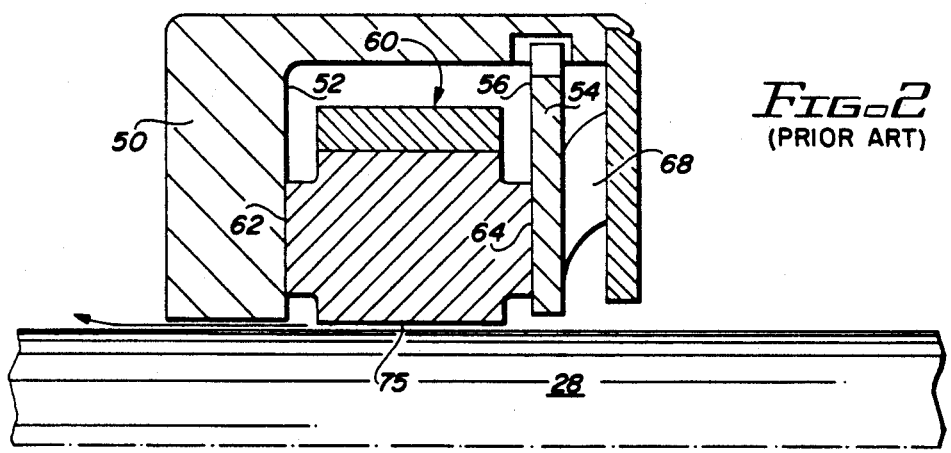
FIG. 2 is a partial longitudinal sectional view of a typical prior art ring seal arrangement with shaft misalignment less than bore clearance.

The present invention will be better understood by first referring to FIG. 2 which shows in detail a typical prior art self-aligning ring seal. With conventional prior art designs, the sealing arrangement is inherently limited by the constraint of the shaft-to-housing misalignments which is a particular problem in larger seal configurations. With the conventional ring seals, the bore clearance can not be less than the shaft-to-housing misalignment otherwise the ring seal will lift off the radial sealing face 62, and create excessive seal leakage through that area. The conventional ring seal has an annular housing 50 with a radially extending sealing face 52. An annular sealing ring 54 having sealing face 56 is axially spaced from surface 52. Ring 54 is secured in place by a suitable spring 68 interposed between one side of the ring and housing member 50.

Ring seal assembly 60 has opposite end faces 62 and 64 in engagement with sealing faces 52 and 56, respectively. The ring seal assembly 60 is provided with an axial bore 75 which receives rotatable shaft member 28. In the conventional ring seal as shown, the bore clearance must be sufficient to accommodate anticipated shaft-to-housing misalignment. This is necessary because otherwise the ring seal will lift off the axial sealing face 52 and thus create excessive leakage.

Figure 2A:
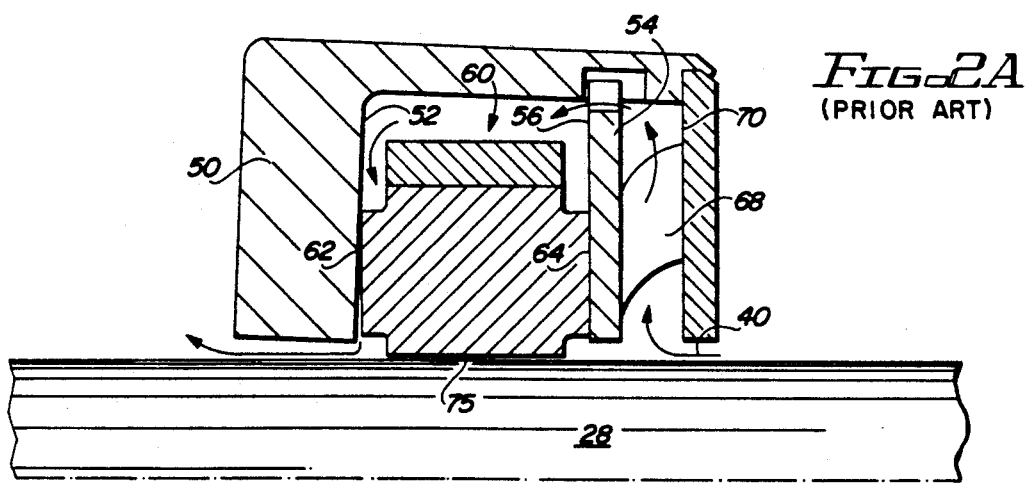
FIG. 2A is a partial longitudinal sectional view of a typical prior art ring seal arrangement with shaft misalignment exceeding bore clearance.

FIG. 2A shows the conventional ring seal of FIG. 2 in an operational condition in which shaft 28 has become misaligned with respect to its housing. This misalignment is translated to the ring seal assembly 60 causing the ring seal assembly to lift away from radial sealing face 52. The opposite nose or face 64 of the ring seal assembly remains in substantial engagement with ring 54 due to the resilience of spring 68. High pressure fluid existing on the right side of the ring seal, as viewed in FIG. 2A, will flow along a leakage path 40 between sealing face 62 and seal housing face 52. Full contact between the ring seal bore and the shaft is maintained in this condition so minimum flow occurs along the ring seal bore 75. However, excessive leakage occurs along the face 62.

As shown in FIG. 2A, conventional ring seals permit an excessive flow path to be established between the shaft and the ring seal bore even under normal operating conditions. In the misalignment condition, excessive leakage occurs at the interface of the stationary seal housing and the end face or nose of the ring seal.

The pressure enhanced self aligning seal assembly 10 of the present invention is uniquely designed to alleviate the problem of excessive leakage and provide minimum flow even under abnormal or high shaft misalignment conditions. The seal assembly 10 is shown installed in a turbine in FIG. 1 and is shown in detail in FIGS. 3 and 3A. The ring seal assembly of the present invention maintains a seal along the bore of the ring seal even at shaft misalignment conditions. Full face contact across the ring seal is also maintained because of the self-aligning feature of the ring seal assembly. In FIG. 3, annularly extending housing member 110 is held in place by a suitable seal carrier secured to the turbine housing. Annular housing 110 has a generally horizontally extending wall 114 and a radially extending end wall 115. A surface 116 is defined at the inner side of wall 115. Horizontal wall 114 is recessed at 117 to receive end cover 120. End cover 120 extends annularly about the shaft having a bore 122 providing substantial clearance between the shaft 28 and the bore 122. The end cover defines an annularly extending recess 125 which receives static seal assembly 130.

The static assembly 130 consists of a generally U-shaped or O-ring member 132 of a suitable elastomeric material such as a Teflon or rubber. Steel spring member 135 is shown as extending annularly within the static seal to support the outer elastomeric seal member. Member 135 may have different configurations but is preferably tubular in cross section as shown.

Seal plate 150 abuts the static seal 130 at radial side 152. The opposite radial side 154 of the seal plate defines a sealing surface which is axially spaced from sealing surface 116. Seal plate 150 has an annular bore which provides generous clearance with shaft surface 28. The outer edge of the seal plate has a bearing surface edge 155 which engages axial bearing surface 160 of the end cover. The surface 155 is shown as being curved or arcuate which is generally preferred. However, other configurations will function. For example, the surface 155 can be inclined forming an acute angle with respect to surface 160. Surface 155 can also be substantially horizontal providing adequate clearance is maintained with respect to surface 160. The shape of surface 155 and its relationship with respect to surface 160 allow the seal plate 150 limited displacement. Plate 150 can shift axially and rock or pivot radially, that is, tilt generally about its centroid which lies on the axial centerline of the shaft. The functional result is that the seal plate is permitted limited axial and radial displacement relative to the end plate and the bearing housing or retainer.

Ring seal assembly 180 is interposed between radial face 116 of the housing and radial face 154 of seal plate 150. Assembly 180 includes an inner ring seal 185 and an outer, annular ring 190. Inner ring seal 185 has a radially extending surface or nose 182 which is in contact with surface 154 of the seal plate. The opposite surface or nose 184 of the ring seal 185 engages surface 116 of the radially extending housing member 114. Ring seal 185 defines a bore 186 which provides minimum clearance with respect to shaft surface 28 in the assembled and nonoperating position. Ring seal member 185 is formed from a suitable material such as carbon or ceramic capable of withstanding high speeds and high temperature conditions over extended periods of operation. Carbon and other high temperature-resistant materials are generally nonflexible and generally exhibit a fairly low rate of thermal expansion in response to changing temperature conditions. As a result, sealing rings of circumferentially continuous form made from carbon expand at a slower rate than the rate of expansion of the shaft in response to increasing operational temperatures. Under these conditions a carbon ring will ultimately become frozen to the shaft.

Accordingly, the ring seal 185 is compressibly held by an outer metallic ring 190 which is shrink fitted about the outer periphery of the inner ring seal 185 to modify the thermal expansion characteristics of the ring seal and to increase the rate of expansion so a gap or clearance is maintained between the bore of the ring seal 185 and the shaft during and following a substantial increase in shaft temperatures. As the shaft temperature increases and the shaft expands, the metallic ring 190 which is generally formed of the same material as the shaft, such as 440C or 4340 stainless steel, also expands at substantially the same rate as the shaft. Expansion of the compression ring 190 permits the seal ring 185 to expand so that its bore 186 will increase in size sufficiently to maintain the predetermined operative clearance between the ring and the shaft. Thus, a controlled gap is maintained at the ring seal bore.

As pressure is introduced across the seal, high pressure fluid acts only on the bore of the ring seal. Pressurized fluid is prevented from acting on the outer diameter of the ring seal assembly and thus a stable air film is generated to enhance seal performance.

The ring seal assembly 180 may be allowed to "float" and accordingly some rotation of the assembly may be induced by the shaft rotation. In some applications, it is preferred that the ring seal assembly be fixed and accordingly an anti-rotation pin 188 may extend from the assembly engaging a notch or recess 189 in the retainer housing.

As seen in FIG. 3, under static conditions a minimum clearance is maintained between the shaft 28 and the ring seal bore 186. As misalignment is introduced to the shaft as shown in FIG. 3A, the ring seal assembly 180 is caused to lift off or away from radial sealing face 116. However, as the ring seal misaligns relative to the seal housing, the self-aligning sealing plate 150 remains in full contact against the nose or surface 182 of the ring seal assembly establishing a primary sealing surface and maintaining a proper seal. The configuration of the self aligning sealing plate allows it to axially and radially displace to translate shaft misalignment to the resilient static seal 130. The static seal being flexible can statically tolerate and accommodate the misalignment with respect to the end cover 120 so effective sealing is maintained.

Figure 4:
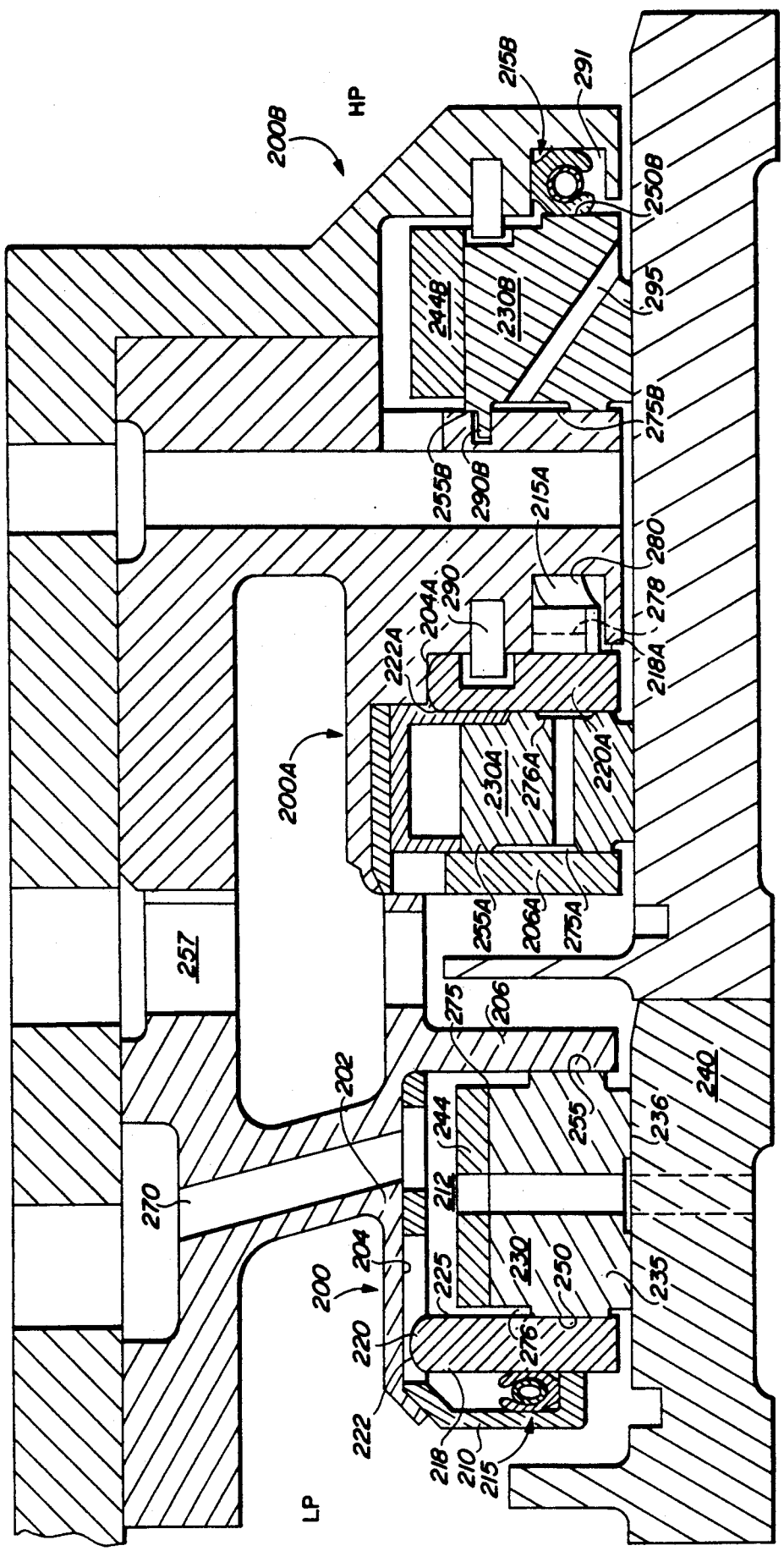
FIG. 4 is a partial longitudinal sectional view showing an alternate embodiment of the seal assembly of the present invention in which multiple stage seals are incorporated, each stage representing a slightly different modification of the ring seal assembly.

FIG. 4 shows another embodiment of the present invention in which a typical installation is shown having a series of seals shown between the high pressure (HP) and low pressure (LP) side of the installation. The individual sealing arrangements are designated by the numerals 200, 200A and 200B, respectively, with the same numerals used throughout FIG. 4 to represent the same or equivalent components. Left hand seal 200 is pressure enhanced to compensate or at least partially compensated to produce a net force which normally tends to urge the sealing components to the low pressure side of the assembly. In this configuration, the bearing assembly includes a housing member 202 which is formed as an integral part of the stator. The housing member defines an axially extending bearing surface 204 and radial end wall 206 which define the bearing chamber 212. A retainer 210 is axially spaced from wall 206.

A static sealing member 215 abuts retainer 210 and engages face 218 of sealing plate 220. The sealing plate has a curved edge 222 which provides a fulcrum acting against the generally axially extending bearing surface 204 of the housing. The opposite surface 225 of the sealing plate engages surface 250 of the sealing ring assembly 230. The sealing ring assembly includes a ring seal 235 preferably of carbon or other material having internal bore 236 closely matching the bore of the associated shaft 240. The carbon ring seal is compressed within an outer compression ring 244 of steel or other material generally having characteristics of thermal expansion the same or similar to that of the shaft. The opposite face 255 of the ring seal assembly engages sealing surface of the housing member 206. The ring seal of this embodiment operates to translate dynamic shaft misalignment into a static misalignment which is accommodated by the static seal 215. Motion is permitted between the upper arcuate surface 222 of the sealing plate and the housing which is transferred to the seal. A primary sealing surface is maintained at surface 250.

Port 270 is provided in the housing and is connected to a source of high pressure fluid. High pressure fluid is introduced into the bearing chamber 212. It will be seen that the ring seal assembly 230 is provided with annularly extending recesses 275, 276 at opposite ends which recesses extend to a radial location approximately corresponding to the horizontal centerline of the static seal 215. Thus, high pressure fluid introduced into the chamber 212 through the port 270 will act at the opposite recesses 275, 276 to pressure balance the ring seal assembly 230 so that little or no net axial force acts on the ring seal assembly or other components to urge these components in one axial direction or the other. The high pressure fluid is sealed by static seal 230 and vented via passage 257. An unbalanced force can cause excessive leakage and erratic performance because the lubricating fluid film between the components can either collapse resulting in zero film thickness or distort causing the film to be too thick resulting in excessive leakage.

Intermediate seal 200A has sealing assembly 230A with nose 255A abutting the radial surface of static member 206A. The opposite nose or end of sealing assembly 230A engages seal plate 220A. These ends are provided with relieved areas 275A and 276A, respectively, which receive high pressure fluid to pressure balance the ring seal assembly. The opposite face 218A of the seal plate engages static seal 215A which is in the form of an annular split piston ring having ends overlapping at stepped portion 278. A wave spring 280 applies a biasing force urging the piston ring into engagement with the seal plate. The outer end 222A of the seal plate is configured to permit limited radial and axial movement relative to bearing surface 204A. Misalignment is transferred to the seal plate and is taken up at the piston ring and wave spring. An anti-rotation pin 290 extends between the plate and housing.

Ring seal assembly 200B is provided at the high pressure side of the assembly shown in FIG. 4. Seal 200B is constructed generally as has been described extending annularly about shaft 240. Ring seal 230B is constrained within outer ring 244B having radial face 255B engaging the stator face. Static seal 215B resides in a recess 291 in the stator and is in direct engagement with surface 250B of the ring seal assembly. Anti-rotation pin or lug 290B extends between the ring seal assembly and the stator. A relieved area 275B is provided in one face of the ring seal and communicates with high pressure fluid via passageway 295 to provide pressure balancing. The area 275 is sized so that the net bi-directional axial forces acting on the ring seal 230B are approximately equal.

Static seal 215B is flexible having an outer elastomeric component and an inner ring of steel or suitable metal. Misalignment is accommodated at the seal 215B and the seal will effectively prevent leakage at both the ring seal/static seal interface and static seal/stator interface.

FIG. 5 shows still another embodiment of the present invention in which an axially and radially displaceable seal plate is provided at opposite ends of the ring seal assembly. In this embodiment, the ring seal is generally designated by the numeral 300. Shaft 302 is rotatable relative to housing or stator member 305. Shaft 302 extends axially within the housing and has a transverse port 306 for transfer of cooling fluid to a remote location. A seal housing 315 is secured to the stator. The seal housing includes an axially extending housing member 320 with depending spaced-apart end covers 322, 324. Each of the end covers defines a recess 325 which receives a static seal member 330 and 330A. The static seal members 330 are as described above including an exterior O-ring member 332 of rubber, Teflon or other elastic material. The static seal may be reinforced by internal annularly extending spring member 334.

Seal plates 336 and 336A engage the static seals 330, 330A at the opposite ends of the seal assembly. The seal plates are fabricated from a suitable hardened steel such as 440C stainless steel. The seal plates 336, 336A each have a radially extending sealing surface 340, 340A. The outer or peripheral edges 342, 342A of the seal plates are curved or arcuate so that limited displacement or pivotal movement is permitted the seal plate relative to the axial surface 345 of the housing.

The seal ring assembly 360 includes ring seal 365 having an axially extending bore 368 closely conforming to the shaft 302. The seal ring, as has been described above, is preferably fabricated of carbon having opposite noses or wear surfaces 370 and 370A engaging the respective sealing plates, 336 and 336A. An outer compression ring 378 extends around the periphery of the seal ring to hold the ring in compression to modify the thermal expansion characteristics of the carbon seal ring. It will be appreciated that as misalignment of shaft 302 occurs, the seal plates 336 and 336A will be permitted radial displacement with regard to the axially extending bearing surface 345. Since each of the seal plates engages a resilient seal 330, 330A, sealing is maintained at the primary sealing surfaces 370 and 370A. These opposite sealing faces of the seal ring will be maintained in full contact with the surface of the associated seal plate to accommodate misalignment and to maintain a positive seal across the faces of the ring seal.

Housing 305 is provided with radial passageway 380 which communicates through port 382 in the ring seal assembly to communicate high pressure cooling fluid to shaft passage 306. The high pressure fluid also acts on the radial recesses 390, 390A at opposite ends of the ring seal assembly 360 to pressure balance the ring seal assembly.

Figure 6A:
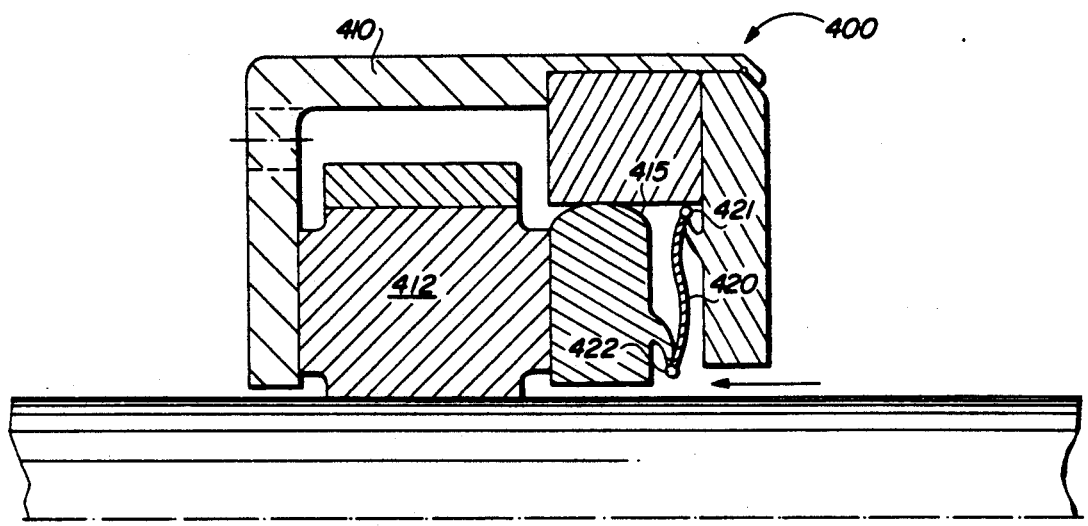
FIGS. 6A, 6B, and 6C show another embodiment incorporating an alternate secondary seal configuration.
Figure 6B:
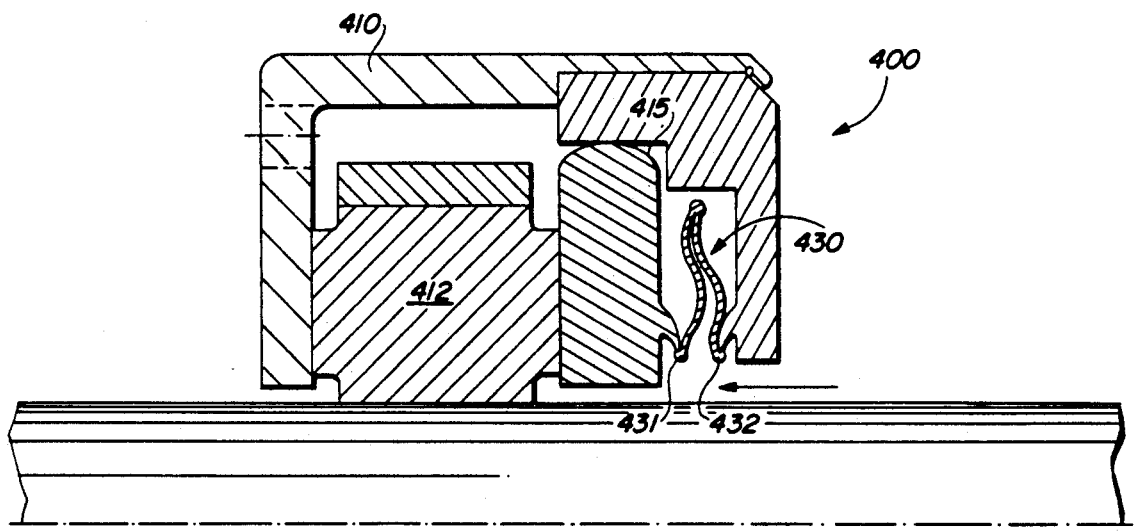
Figure 6C:
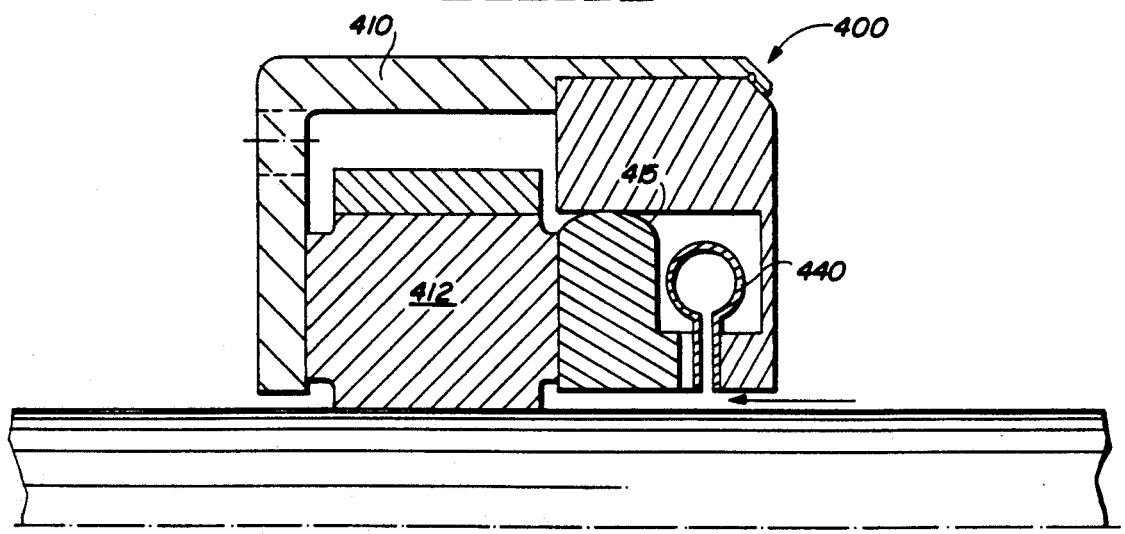

FIGS. 6A to 6C illustrate an alternate embodiment of the invention. In each drawing the sealing assembly is designated by the numeral 400 and is generally constructed as described above having a housing 410 containing a ring seal assembly 412 having opposite radial faces. The ring seal assembly in each figure engages a seal plate which is permitted limited axial and radial displacement having a bearing surface 415.

In FIG. 6A the secondary static seal 420 is in the form of an annularly extending diaphragm metal bellows welded at opposite ends to the housing at 421 and to the seal plate at 422.

In FIG. 6B the secondary static seal 430 is a nesting ripple type of metal diaphragm having its end again welded to the seal plate and housing at 431 and 432.

In FIG. 6C a toroidol configuration is shown for the secondary seal 440 having the ends of the seal attached to the housing and seal plate.

Thus, the secondary seal may be a wide variety of flexible materials including plastic, metal or rubber.

It will be seen that the present invention provides an improved mechanical seal which meets the objectives and advantages set forth above. The mechanical seal of the present invention provides substantial functional advantages over prior art seals as has been described. The design of the seal of the present invention also provides manufacturing advantages over conventional ring seals. The primary sealing faces of the seal can be lapped with standard lapping equipment and surfaces can be inspected with standard optical flats. The tolerances of individual parts do not require extremely precise control for squareness due to the self-aligning concept of the seal. This results in a lower scrap rate due to the ease and convenience of manufacturing. Further, the seal can be easily serviced.

The functional benefits include minimum fluid flow under all operating conditions. The problem of shaft misalignment is no longer a major factor in seal performance with the seal of the present invention. Distortion of the main sealing face is avoided due to the press fit of the seal housing. An improved air film stiffness at the seal bore occurs thus reducing the wear rate of the bore.

While the foregoing invention has been described with reference to various embodiments of the seal as applied to a rotating member or shaft having a constant diameter, it will be appreciated that the seal arrangement is also applicable to a tapering seal arrangement. In such a case, the ring seal assembly will have a taper to further enhance the load carrying capabilities of the seal assembly.

While the invention has been described in connection with several specific embodiments thereof, it will be obvious to those skilled in the art that various changes, modifications and variations can be made in light of the foregoing description without departing from the spirit and scope of the appended claims.

I claim:

1. A self aligning mechanical seal for sealing fluid flow between a high pressure area and a low pressure area along a stator member and an axially extending relatively rotatable member, said seal comprising:
   (a) a housing member extending circumferentially about said rotatable member having a retainer surface and an axially extending bearing surface;
   (b) a static resilient seal engaging said retainer surface;
   (c) an annular seal plate in said housing member having a first sealing surface engaging said static resilient seal and an opposite second sealing face spaced relatively from said first sealing face, said seal plate having an outer peripheral edge engaging said bearing surface and configured to permit the seal plate at least limited radial displacement relative to said bearing surface; and
   (d) a ring seal assembly in said housing member extending annularly about said rotatable member in close tolerance thereto, said ring seal assembly having opposite end faces, one of which is in sealing engagement with said second sealing face whereby misalignment of said rotatable member will be transferred to said static seal via said ring seal assembly and said seal plate to maintain substantially full sealing contact at the said one end face and second sealing face and whereby fluid is sealed at said static seal.

2. The seal of claim 1 wherein said ring seal assembly has an inner annular ring of high temperature resistant material and an outer annular compression member.

3. The seal of claim 2 wherein said inner annular ring is carbon and the outer annular compression member has a thermal coefficient of expansion substantially equal to that of the rotatable member.

4. The seal of claim 1 wherein said static seal is an elastomeric material.

5. The seal of claim 1 wherein porting is provided to direct high pressure fluid to at least one of the said opposite end faces of said ring seal assembly to provide pressure balancing of the same.

6. The seal of claim 1 wherein said housing and ring seal assembly are provided with passageways for transmission of cooling fluid to said rotatable member.

7. The seal of claim 1 wherein said outer peripheral edge of said seal plate is generally arcuate.

8. The seal of claim 1 wherein at least a portion of said outer peripheral edge defines an acute angle with respect to said bearing surface.

9. The seal of claim 1 including anti-rotational means connecting said ring seal assembly to said housing member.

10. The seal of claim 1 wherein said static seal is a diaphragm seal.

11. A self aligning mechanical seal for sealing flow between a high pressure area and a low pressure area along a stator member and an axially extending rotatable member, said seal comprising:
   (a) a housing member extending circumferentially about said rotatable member having an annular bearing surface and axially spaced apart first and second retainer members;
   (b) a first static resilient seal engaging said first retainer member;
   (c) a second static resilient seal engaging said second retainer member and axially spaced from said first static resilient seal;
   (d) a first annular seal plate having a first radial surface engaging said first static resilient seal, said first annular seal plate having an oppositely disposed second sealing surface and a peripheral edge engaging said bearing surface and configured to permit displacement of the seal plate relative to said bearing surface;
   (d) a second annular seal plate having a first radial surface engaging said second static resilient seal, said first annular seal plate having an oppositely disposed second sealing surface and a peripheral edge engaging said bearing surface and configured to permit displacement of the seal plate relative to said bearing surface;
   (f) a ring seal assembly extending annularly about said rotatable member in close tolerance thereto, said ring seal assembly having opposite end faces engaging the respective second sealing faces of said first and second seal plates whereby misalignment of said rotatable member is transferred to said first and second static resilient seals via said ring seal assembly and said seal plates and substantially full sealing contact is maintained between said ring seal assembly and said seal plates.

12. The seal of claim 11 wherein said seal assembly has an inner annular ring of high temperature resistant material and an outer annular compression member.

13. The seal of claim 12 wherein said inner annular ring is carbon and the outer compression member has a thermal coefficient of expansion substantially equal to that of the rotatable member.

14. The seal of claim 11 wherein said static seal is an elastomeric material.

15. The seal of claim 11 wherein porting is provided to direct high pressure fluid to the said opposite end faces of said ring seal assembly to pressure balance same.

16. The seal of claim 11 wherein said housing and ring seal assembly are provided with passageways for transmission of cooling fluid to said rotatable member.

17. The seal of claim 11 wherein said outer peripheral edge of said seal plate is generally curved.

18. The seal of claim 11 including anti-rotational means connecting said ring seal assembly to said housing member.

* * * * *